G. C. SOULE.
CHAIN REPAIR LINK.
APPLICATION FILED JAN. 26, 1914.
1,100,103.
Patented June 16, 1914.
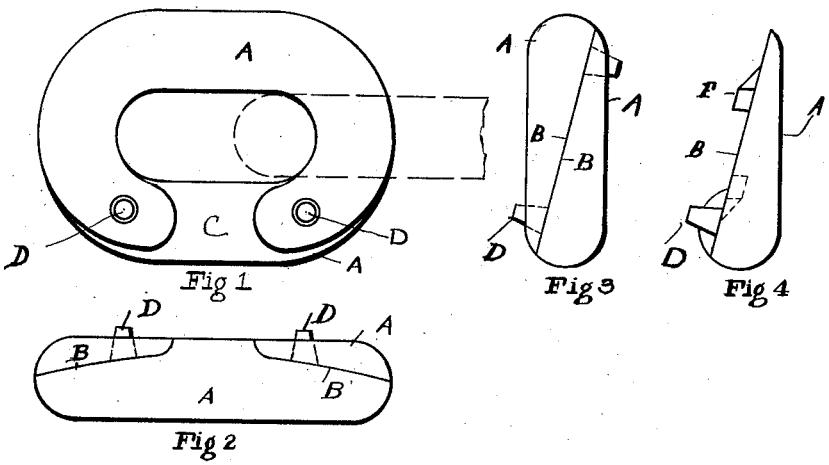
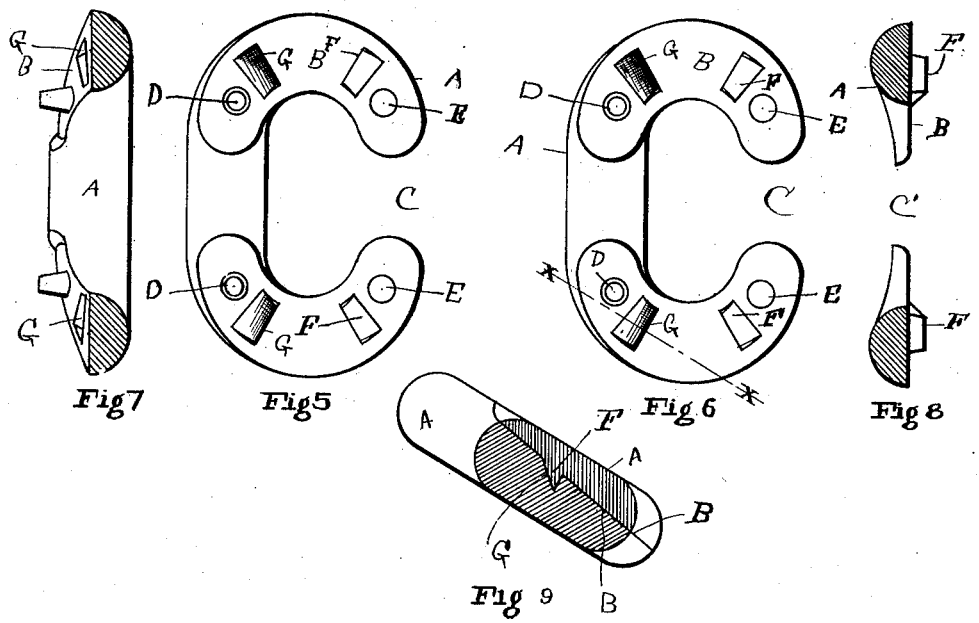
WITNESSES
John D Ross
Mary C. Page
INVENTOR
George C. Soule,
by Esquire Merrill,
Attorney

UNITED STATES PATENT OFFICE.

GEORGE C. SOULE, OF SOUTH PORTLAND, MAINE, ASSIGNOR TO MARINE HARDWARE-EQUIPMENT COMPANY, OF SOUTH PORTLAND, MAINE, A CORPORATION OF MAINE.

CHAIN-REPAIR LINK.

1,100,103.      Specification of Letters Patent.      Patented June 16, 1914.

Application filed January 26, 1914. Serial No. 814,359.

*To all whom it may concern:*

Be it known that I, GEORGE C. SOULE, a citizen of the United States, residing at South Portland, in the county of Cumberland and State of Maine, have invented certain new and useful Improvements in Chain-Repair Links, of which the following is a specification.

My invention relates to chain repair links or links made in two parts, each part having an open side, the two parts being separable and when separated, capable of being inserted in links of a chain. The general character of such a link is shown in Letters Patent No. 193295, dated July 17, 1887, wherein the two link parts are shown provided with pins on one part adapted to interlock in holes in the other part, the free ends of the link parts being beveled and overlapping. When constructed according to said patent, the strain on the link tends to straighten the free ends of the link outwardly, the bending taking place at points on either side of the center and spaced apart therefrom between the longitudinal center of the link and the pins, the meeting faces tending to slide one on the other and thereby to cut the pins. This is especially true when the strain on the repair link is exerted in a direction outside of the plane of the chain link, as is the case when the connecting chain link is in a position at an angle to the repair link and particularly when the bearing is only on the thinner part.

The object of the present invention is to strengthen the repair link at these points and thereby prevent the cutting off of the pins and straightening of the link members.

In the drawing herewith accompanying and making a part of this application, Figure 1 is a plan view of my improved link showing its position in a chain, the chain link proper being shown in dotted lines; Fig. 2 is a side elevation of my improved link; Fig. 3 is an end view of same; Fig. 4 is an end view of one of the link parts; Figs. 5 and 6 are plan views of the meeting faces of the two parts of a link, the two being similar; Fig. 7 is a longitudinal central sectional view of the closed side of one of the parts; Fig. 8 is a similar view of the open side of one of the parts; and Fig. 9 is a sectional view of a complete link taken on a line corresponding with line X—X in Fig. 6.

Same reference characters indicate like parts in the several views.

In said drawings A are two similar link parts having beveled meeting faces B adapted to overlap and openings at one side, as seen at C, so that, when placed together, the open side of one part is directly opposite the closed side of the other part, the two, when placed together, forming a complete link. Near the ends of the open sides are holes D adapted to receive pins E suitably placed to receive them on the closed sides of the opposite part. Between said holes and the transverse longitudinal center of the link parts on the beveled faces thereof, I form projections F extending diagonally to the longitudinal center plane of the link parts and on the closed side of the parts, I form correspondingly shaped recesses G adapted to receive said projections F, when the two parts are placed in operative position, as seen in Fig. 9. The projections, it is noted, are formed on the thinner beveled faces of the link parts while the recesses are in the thicker parts nearer the closed side. These projections and recesses are located substantially at the points where the link parts would be liable to bend first, the projections strengthening the link parts at these points. When the projections and sockets have their meeting faces extending diagonally the interlocking faces afford the greatest possible resistance to the tendency to bend the free ends of the link.

The advantages of my improved link structure are: that it tends to afford a very strong resistance to the tendency of the free ends of the link to straighten in whatever direction the strain comes; it affords a durable lock to the open ends of the link parts at the point where the greatest strain comes tending to break the link; there is an immediate resistance to strain from any direction.

Having thus described my invention and its use, I claim:

1. A repair link consisting of two members each open at one side and having beveled ends provided with pin receiving holes, pins on the opposite member adapted to interlock in said holes, said members also having recesses in the closed sides intermediate the pins and the longitudinal central plane of the link and projections on the open sides intermediate said holes and the central longitudinal plane of the link adapted to take into said recesses when the parts are coupled together.

2. A repair link consisting of two members each open at one side and having beveled ends provided with pin receiving holes, pins on the opposite member adapted to interlock in said holes, said members also having diagonally disposed recesses in the closed sides intermediate the pins and the longitudinal central plane of the link and diagonally disposed projections on the open sides intermediate said holes and the central longitudinal plane of the link adapted to interlock in said recesses when the parts are coupled together.

GEORGE C. SOULE.

Witnesses:
CHARLES L. FOSTER,
MARY C. PAGE.